United States Patent [19]

Herd

[11] 4,294,284
[45] Oct. 13, 1981

[54] FAIL-SAFE, NON-PRESSURE LOCKING GATE VALVE

[75] Inventor: David P. Herd, Kingwood, Tex.

[73] Assignee: Smith International, Inc., Newport Beach, Calif.

[21] Appl. No.: 93,612

[22] Filed: Nov. 13, 1979

[51] Int. Cl.³ .................. F16K 31/122; F16K 3/00
[52] U.S. Cl. ........................... 137/613; 137/236 S; 251/63.6; 251/327
[58] Field of Search ............ 137/236, 236 S, 505.13, 137/613; 251/282, 63.6, 327

[56] References Cited

U.S. PATENT DOCUMENTS

| | | | |
|---|---|---|---|
| Re. 30,115 | 10/1979 | Herd et al. | 251/63.6 |
| 2,885,172 | 5/1959 | Nath | 251/174 |
| 2,974,677 | 3/1961 | Nath | 137/456 |
| 3,933,338 | 1/1976 | Herd et al. | 251/63.6 |
| 4,029,294 | 6/1977 | McCaskill et al. | 251/282 |
| 4,230,299 | 10/1980 | Pierce, Jr. | 251/282 |

FOREIGN PATENT DOCUMENTS 600536  3/1978  United Kingdom ............ 137/505.13

OTHER PUBLICATIONS

Composite Catalog of Oil Field Equipment: Service World Oil, 1976, pp. 4085, 4086, 1340, 1341.
How To Make a Valve Whirl Will Fail-Safe in Very Deep Water, 1977.
Development of High Pressure Valves for Unattended Service, Fowler, ASME, 1967.

Primary Examiner—A. Michael Chambers
Attorney, Agent, or Firm—David Alan Rose; Murray Robinson; Ned L. Conley

[57] ABSTRACT

A fail-safe non-pressure locking valve, actuated by hydraulic controls responsive to ambient sea pressure, disposed over 1000 feet below the surface on a submerged pipeline controlling the flow of fluids therethrough. The valve includes a housing having a chamber within which a gate, having upper and lower attached stems, reciprocates for opening and closing the valve to fluid flow. A piston, responsive to the hydraulic actuator controls, is attached to the upper stem for urging the gate to the open position upon application of hydraulic actuator fluid pressure. A spring is arranged in the valve housing to assist the internal valve pressure on the stem in urging the gate to its closed position in the event of loss of hydraulic actuator fluid pressure. A lower detached stem is disposed in the valve chamber below the lower attached stem and is responsive to ambient sea pressure. When the ambient sea pressure becomes greater than the internal valve pressure, the lower detached stem engages the lower attached stem. A second spring is disposed below the lower detached stem to overcome frictional forces between the lower detached stem and seals in the valve housing when the lower detached stem moves to its engagement position. A port extends through the valve housing from between the lower attached and detached stems to the side of the valve opposite the side of the valve connected to the short section allowing fluid between the lower attached and detached stems to be displaced as the gate moves downwardly to the open position or as the lower detached stem moves upwardly to engage the lower attached stem. Thus, by venting the internal valve pressure through the port, pressure lock is avoided where internal valve fluids otherwise would be prevented from being displaced from the valve chamber.

2 Claims, 6 Drawing Figures

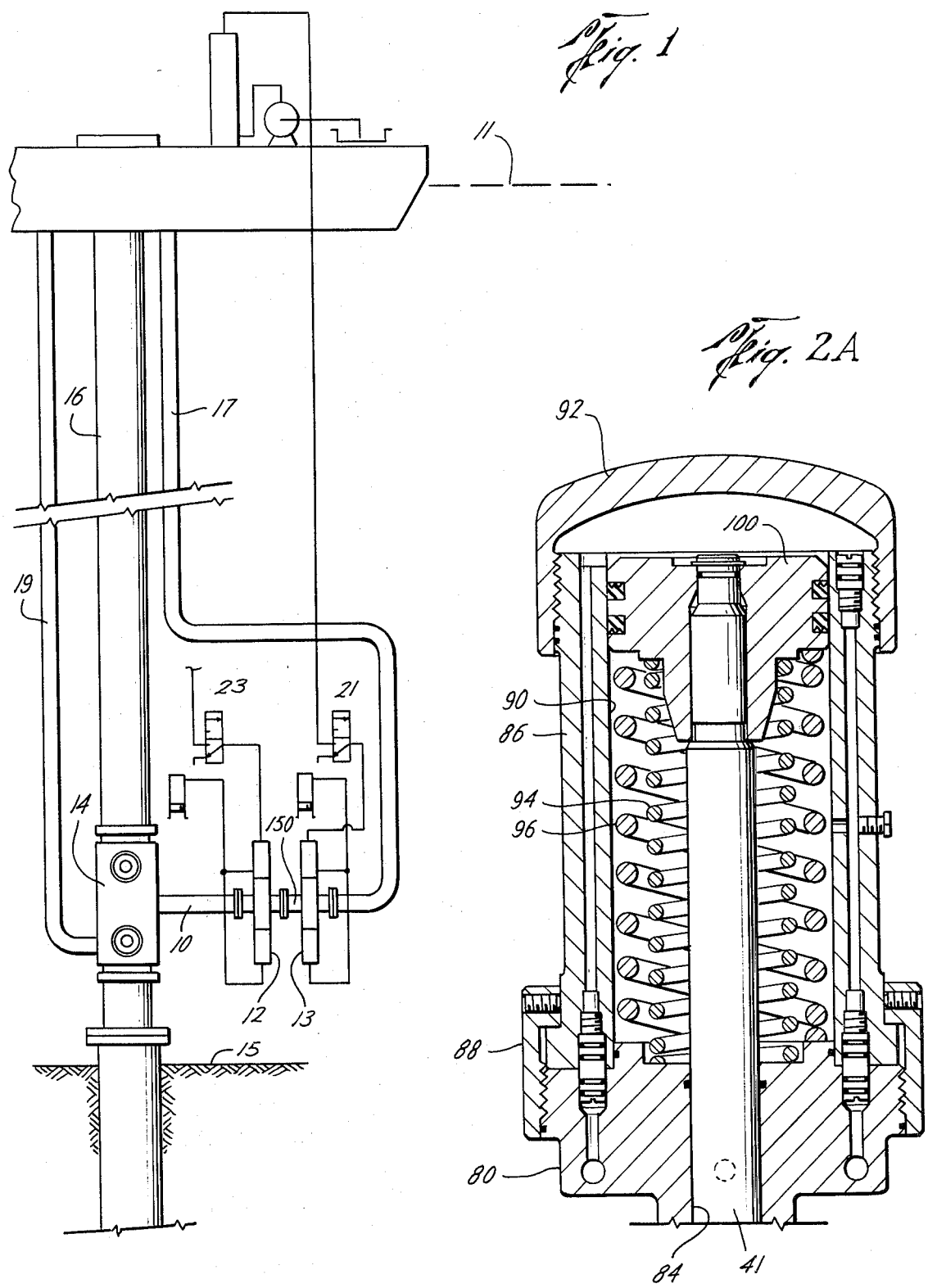

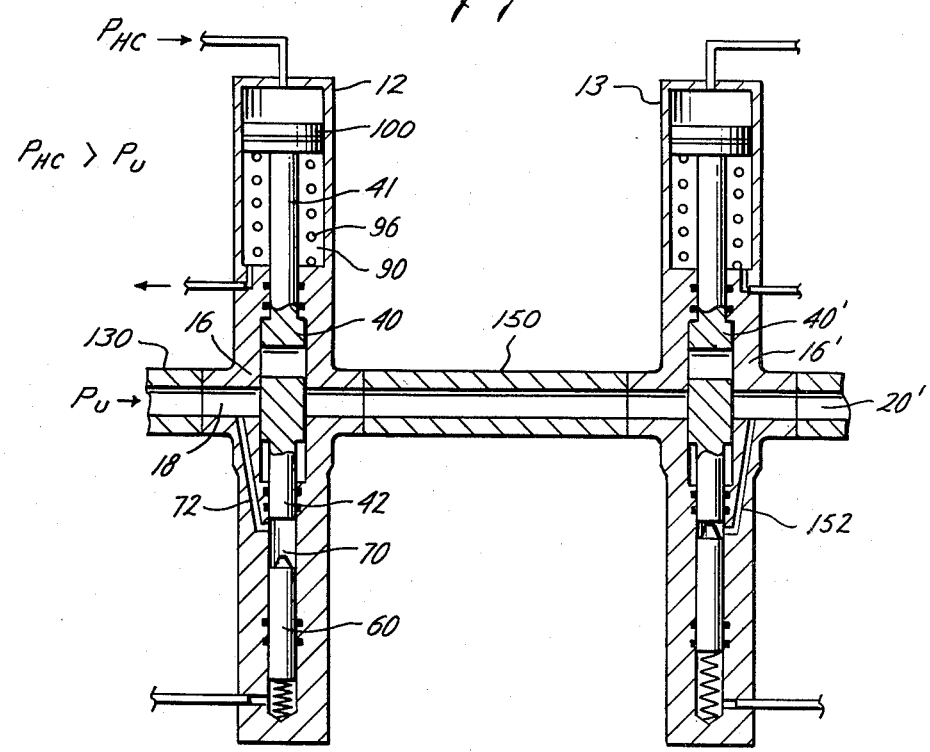
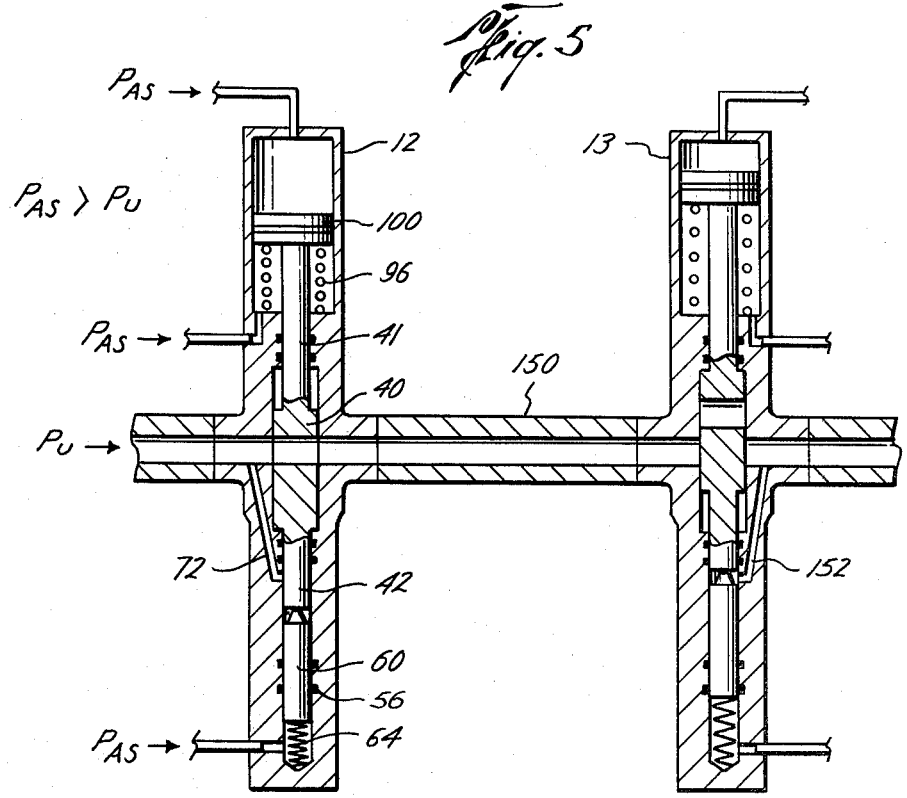

FAIL-SAFE, NON-PRESSURE LOCKING GATE VALVE

TECHNICAL FIELD

This invention pertains to high-pressure gate valves for unattended service, and more particularly to subsea fail-safe gate valves subjected to pressure locking conditions while disposed on underwater pipelines or flowlines near the ocean floor.

BACKGROUND ART

The adaptation of an oilfield gate valve for long unattended service requires changes in the basic design of the valve. A typical through-conduit, rising stem, gate valve includes a valve body having a flow way through which the pipeline fluids pass and a chamber intersecting the flow way interiorly of the valve body. A gate is disposed within the chamber for reciprocation across the flow way where in the lower position, for example, a flow port in the gate registers with the flow way to permit line fluids to flow through the valve and in the upper position the gate blocks flow through the flow way. The gate is reciprocated within the valve chamber by an actuator which may be electrical, hydraulic, or pneumatic causing the gate to move across the flow way to open and close the valve.

In oilfield operations it is desirable for gate valves in long unattended service to have "fail-safe" valve operators. A fail-safe operator returns the valve to the safe (generally closed) position upon sensing a failure of its power source such as loss of electrical potential or hydraulic or pneumatic pressure. This means that in a fail-safe operator, the power source must be applied to the operator continuously when it is in the "unsafe" position.

Generally conventional subsea fail-safe gate valves rely upon hydraulic actuator pressure to move the gate downwardly in the valve body and upon internal valve pressure to move the gate upwardly after loss of hydraulic pressure. A spring is disposed in the actuator cylinder to assist the force of the internal valve pressure on the stem urging the gate upwardly to insure that the valve will fail-safe close when internal valve pressure is very small. The position of the gate without actuator pressure is the "normal" or "safe" position of the valve and may be open or closed depending upon the location of the flow port in the gate. For further discussion of the design of high-pressure valves for unattended service, reference is made to the Natho U.S. Pat. Nos. 2,885,172 and 2,974,677 and the article "Development of High-Pressure Valves for Unattended Service" by John H. Fowler published by ASME in 1967.

Fail-safe gate valves with pneumatic or hydraulic actuators have been used for years on conventional land and offshore Christmas trees. Subsea drilling from floating vessels caused trees and BOP stacks to become located on the ocean floor. It was a logical extension to use these conventional fail-safe valve designs for BOP stack valves, production valves, or tree production valves in subsea operations.

Remote subsea fail-safe gate valves are most often used with hydraulic actuators. The hydraulic actuators and often their controls are located at the ocean floor. One of the reasons for such location is the effect of the hydrostatic head, i.e. ambient sea pressure, on the actuators. Although the location, configuration and types of actuators and controls vary, their operation is subjected to ambient sea pressure whether the actuator and controls are a closed or open hydraulic system.

The time required for a fail-safe valve to fail-safe close is critical and a short response time is desirable to reduce the amount of throttling as the valve moves into the normal position. For most fail-safe valves, fail-safe closure occurs without difficulty at depths commonly encountered, and successful use of these fail-safe valves in water depths to 1,000 feet has been common for years. However, as water depth increases, increased hydrostatic head, or ambient sea pressure, creates forces on the valve not normally considered in valve designs for common depths. The design of these valves approaches a threshold whereby a combination of conditions can unreasonably delay or preclude the fail-safe closure of this type of gate valve. Such standard fail-safe valves may be delayed in closing or fail to close under supposed fail-safe conditions at these increased depths upon loss of hydraulic control pressure coupled with low internal valve line pressure when the ambient sea pressure becomes greater than the internal line pressure or internal valve pressure of the valve.

Both sides of the valve piston of a conventional fail-safe valve are subjected to ambient sea pressure since the piston is part of the hydraulic actuator and controls for the valve. Where the ambient sea pressure becomes greater than the upstream line pressure at increased depth, a downacting force on the piston is created by the ambient sea pressure tending to keep the valve open even if hydraulic actuator pressure is lost. This downacting force due to the hydrostatic head is the difference between the ambient sea pressure and internal valve pressure multiplied by the piston's stem diameter. When this downacting force becomes greater than the spring load on the piston, the valve will remain open and fail to close under fail-safe conditions.

As valve size increases it becomes even more impractical to increase the spring load to overcome the downacting force caused by increased ambient sea pressure. The use of a precharged accumulator in place of the spring also may not be satisfactory since long-term use in unattended service requires better reliability than typically has been demonstrated by precharged accumulators in actual subsea service.

This unwanted force resisting closure in conventional fail-safe valves caused by increased ambient sea pressure has been eliminated by attaching a lower stem to the gate and permitting the ambient sea pressure to act on both the upper and lower stem areas. Thus the ambient sea pressure and internal valve pressure act on the upper stem with an equivalent opposing force on the lower stem providing a zero net force on the gate which now depends solely on the spring force for closure. However, in this design the gate drag becomes exceedingly large and may be impractical where the differential pressure across the gate approaches the upstream pressure.

One solution to this problem is described and claimed in U.S. Pat. No. 3,933,338 issued Jan. 20, 1976 to Herd, McCaskill and Childers entitled "Balanced Stem Fail-Safe Valve System". That patent discloses the use of a lower stem which can contact, but is not connected to, the gate. The upper end of the lower detached stem is subjected to internal valve pressure and the bottom end is acted on by the ambient sea pressure which also acts on the upper stem attached to the gate. Where the internal valve pressure is greater than the ambient sea pressure, the lower detached stem remains pushed down and does not engage the gate permitting the valve system to function as a conventional fail-safe valve. Hence it plays no part in valve functions. However, in the fail-safe mode, i.e. the loss of control pressure combined with low internal valve pressure, the lower detached stem moves upwardly to contact and exert force on the gate balancing the unwanted force from the ambient sea pressure on the upper stem. For further design information on such valves, reference is made to the article "How to Make a Valve Which Will Fail-Safe in Very Deep Water" by D. P. Herd and J. W. McCaskill published in 1976 by the ASME.

However, such fail-safe valves designed for increased ambient sea pressure are still subject to pressure lock. Pressure lock occurs when line fluids in the valve chamber, for some reason, cannot be displaced during the reciprocation of the gate. Resistance to the displacement of the line fluids delays opening and if great enough, may prevent the valve from opening at all.

Under conventional conditions, pressure lock does not pose a problem to either unbalanced or balanced fail-safe valves. In a fail-safe valve having no lower gate stem the line fluids in the valve chamber are displaced between the upstream side of the gate and valve body to avoid pressure lock and in a fail-safe valve having a lower gate stem extending into a bore in the lower valve body and in sealing engagement therewith, the line fluids are displaced through a port extending from the bore below the lower stem to the flow way. See publications on the McEvoy Model "EU" Straightway Valve including the 1976-1977 Composite Catalog of Oilfield Equipment and Services. Thus in either case as the gate or lower stem reciprocates within the valve body, means are provided to permit displacement of line fluids within the valve chamber or bore.

In many subsea drilling and production operations two fail-safe valves, such as disclosed in the above Herd et al patent, are disposed in series on the subsea BOP choke or kill line and may be subjected to potential pressure lock conditions. The valve adjacent to the BOP stack is called the inboard valve and the other valve, generally connected to the "choke or kill" line extending to the surface, is the outboard valve. The valves are generally connected hub to hub or with only a short section of flowline disposed between the two valves creating a small flow bore volume. Where the flowline fluid is incompressible, the relatively small finite flow bore volume, when compared to the volume of the production line or choke and kill line, may preclude the inboard valve from displacing internal valve fluids downstream between the inboard and outboard valves where the gates seal around the flow ways of the valves and the flow bore is filled with the incompressible flowline fluid thus causing the inboard valve to pressure lock and fail to open.

For example, in testing the pipe rams of a blow-out preventer, a test plug is run into the subsea well to seal off the well at the wellhead. The pipe rams are activated and the inboard and outboard valves on the choke line are closed. The kill line is pressurized to test the pipe rams. If the short flow line between the inboard and outboard valves also becomes pressurized due to leakage of the inboard valve or because the inboard valve is closed during pressurization for example, and the pressure in the kill line is bled off rapidly, pressurized incompressible fluid, such as fresh or salt water, will become trapped in the short flow line. As the pressure in the kill line drops, the pressure in the short flow line causes the gate of the inboard valve to seal on the blow-out preventer side of the inboard valve and the gate of the outboard valve to seal on the choke line side of the outboard valve. This situation prevents the displacement of internal valve fluids of the inboard valve upon actuation and causes it to pressure lock and fail to open. The internal valve fluids cannot be displaced on the one side because of the sealed gate and they cannot be displaced on the other side because of the incompressible fluid in the short flow line between the valves.

Fluid pressure may also become trapped between the valves during the testing of the inboard and outboard valves themselves. It is not uncommon to close one of the valves and apply fluid pressure through the choke or kill line to test the seals. If the other valve is closed and the choke or kill line is bled rapidly, fluid pressure may become trapped between the valves due to the gates sealing the fluid pressure in the short section.

The same phenomenon may occur in gate valves having a split gate. Where fluid pressure is trapped between the gate halves causing a seal on both the upstream and downstream sides of the valve by the gate segments, the valve can pressure lock itself where the internal valve fluid cannot be displaced thereby preventing the valve from opening.

The invention overcomes the pressure lock and fail-safe closure defects seen in prior art valves operating in series or with a split gate on a submerged flowline controlling the flow of an incompressible fluid over 1,200 feet below sea level.

SUMMARY OF THE INVENTION

In accordance with the teachings of the invention, the valve comprises a housing having a chamber within which a gate having upper and lower attached stems reciprocates for opening and closing the valve to fluid flow. A piston, responsive to the hydraulic actuator controls, is affixed to the upper stem for urging the gate to the open position upon application of fluid pressure from the controls. A closure spring is arranged in the actuator housing to urge the piston and thus the gate to the closed position upon the loss of fluid pressure from the controls. A lower detached stem is disposed in the valve chamber below the lower attached stem. The lower detached stem is responsive to ambient sea pressure and when the ambient sea pressure becomes greater than the internal valve pressure, the lower detached stem engages the lower attached stem to counterbalance the force of the ambient sea pressure on the piston. A second spring is disposed below the lower detached stem to overcome frictional forces between the lower detached stem and seals in the valve housing. A port extends through the valve housing from between the lower attached and detached stems to release the internal valve pressure as the gate moves to the open position and to allow the internal valve pressure, when greater than ambient sea pressure, to act on lower attached stems to provide additional closing force.

BRIEF DESCRIPTION OF THE DRAWINGS

FIG. 1 is a schematic view of the enviromment of the valve system of the invention;

FIGS. 2A and 2B illustrate in detail one embodiment of the valve of the invention disposed in the flowline as an inboard valve;

FIG. 4 is a schematic view of the inboard and outboard valves disposed in series on the flowline with both valves closed; and FIG. 5 is a schematic view of the inboard and outboard valves disposed in series on the flowline with the inboard valve open and the outboard valve closed.

DESCRIPTION OF THE PREFERRED EMBODIMENT

Figure 2B:
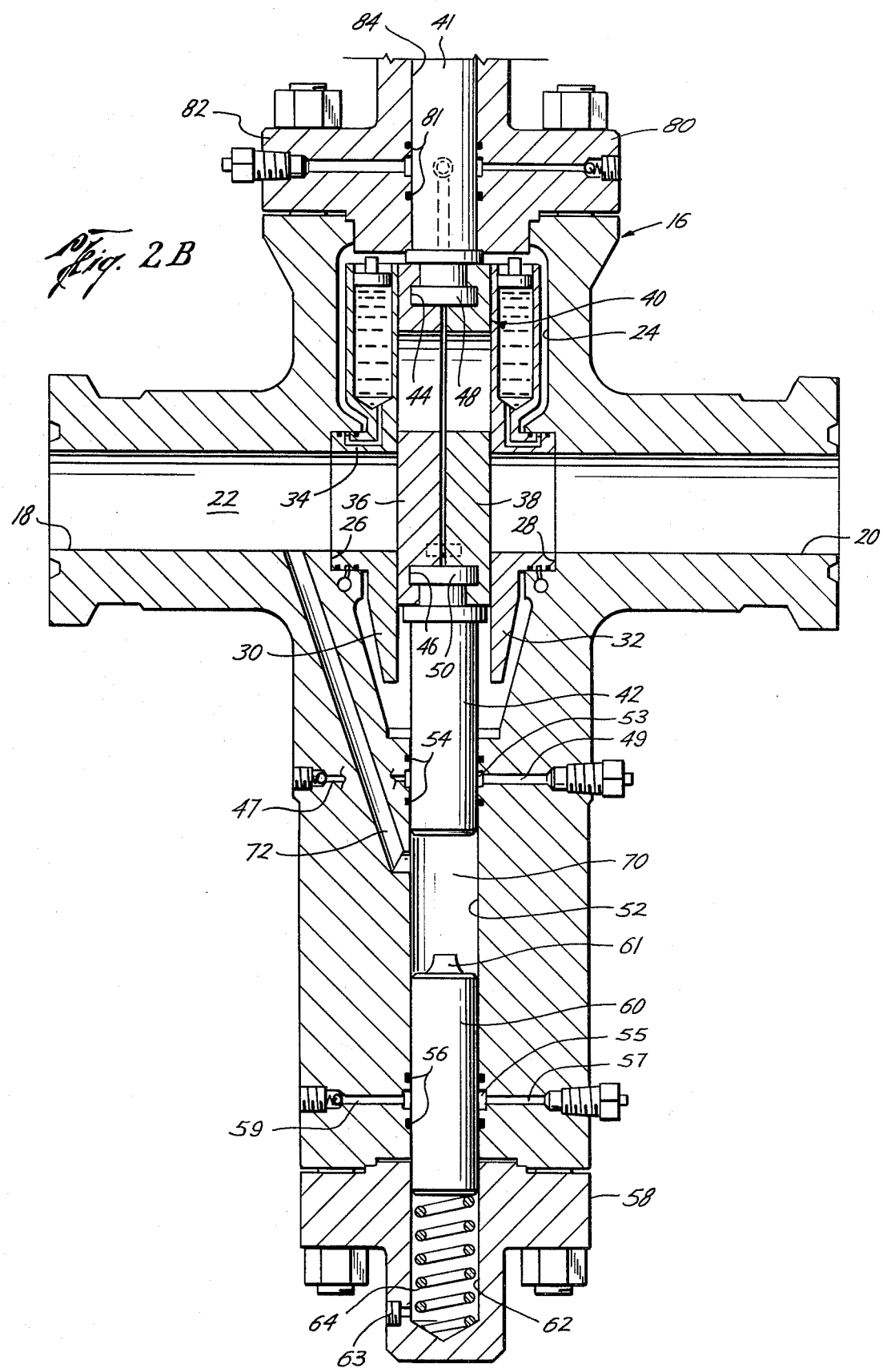

Referring initially to FIG. 1 illustrating one environment of the invention, an inboard valve 12 and an outboard valve 13 are disposed in series on a pipeline or flowline 10 submerged well over 1,000 feet below the water surface 11 for controlling the flow of line fluids through flowline 10. The inboard valve 12 in this particular application is connected to a BOP stack 14 at the ocean floor 15 and outboard valve 13 is connected to a choke line 17 extending to the surface 11. A kill line 19 is connected to BOP stack 14 and extends to the surface 11. Kill line 19 also will have an inboard and outboard valve (not shown). Hydraulic actuator controls 21, 23 located near the ocean floor actuate valves 12, 13 respectively. Generally the normal position will be in the closed position. It should be understood that the application of the present invention on a BOP stack is for illustration purposes only and that the present invention is useful for many other subsea operations such as on a Christmas tree.

The details of the preferred embodiment of inboard valve 12 are shown in FIG. 2B. Valve 12 is of the through-conduit, rising stem, gate type comprising a valve body or housing 16 having opposed flow ports 18, 20 forming flow way 22 through which the line fluids pass. As illustrated, flow port 18 is the upstream portion or inlet of valve 12 and flow port 20 is the downstream or outlet portion. The inner ends of flow ports 18, 20 are provided with coaxial counterbores 26, 28 respectively, which circumscribe and have a diameter larger than flow ports 18, 20.

A cylindrical closure or gate chamber 24 intersects flow way 22 interiorly of housing 16 generally at right angles thereto. Gate chamber 24 and flow port counterbores 26, 28 are adapted to receive a pair of seat members 30, 32. Seat member 30 has an outwardly facing surface shaped substantially complimentary to the shape of gate chambers 24 and includes a neck or hub 34 to be received by counterbore 26. Seat member 30 is provided with a transverse opening coaxial and registering with flow port 18 and flow way 22 and generally of the same diameter. The inwardly facing surface of seat member 30 is shaped to cooperate in sliding engagement with an abutting face of gate 40 as will be described hereinafter.

Seat member 32 and its appurtenances are identical in construction and arranged symmetrically on the opposite side of gate chamber 24 to seat member 30 and therefore the description of member 30 will be applicable to both.

Gate 40 is disposed between seat members 30, 32 within gate chamber 24 for reciprocation across flow way 22. Gate 40 is preferably constructed by a pair of mating gate segments 36, 38 but may be a one-piece slab gate. Gate segments 36, 38 of gate 40 are provided near their upper end with a transverse flow port adapted to register with flow ports 18, 20 when gate 40 is lowered to the open position, and gate segments 36, 38 are provided near their upper end with a closure section adapted to prevent fluid flow through flow way 22 when gate 40 is raised to the closed position as illustrated in FIG. 2B.

Gate 40 is reciprocated by means of an upper stem member 41 and a lower stem member 42. Stem members 41 and 42 are attached to gate 40 by counterbores 44, 46 in gate segments 36, 38 with T-shaped cross section matingly receiving lug heads 48, 50 on the ends of stems 41, 42.

The lower portion of valve housing 16 includes a reduced diameter lower stem bore 52 coaxial with gate chamber 24 for slidingly receiving lower gate stem 42. Packing seals 54, mounted in annular grooves in the housing 16 around stem bore 52, seal around channel 53 to contain packing inserted through injection port 49. Excess packing is bled off through bleeder line 47. Seals 54 and the packing sealingly engage lower attached stem 42 and housing 16 as gate 40 reciprocates between the open and closed positions.

A lower detached stem 60 is also slidingly received by stem bore 52 below lower attached stem 42. Lower detached stem 60 includes a reduced diameter portion on head 61 adapted for engaging lower attached stem 42, detached stem 60 is not connected to attached stem 42. Packing seals 56 are mounted in annular grooves in housing 16 within bore 52 for containing packing injected into annular channel 55 through injection port 57. Excess packing is bled off through port 59. The packing and seals 56 sealingly engage lower detached stem 60 as stem 60 reciprocates within stem bore 52.

Bore 52 extends to the exterior of housing 16 and is closed by lower closure cap 58 mounted on housing 16 by stud bolts or the like. Lower closure cap 58 has a bore 62 which is a coaxial extension of stem bore 52 with a slightly larger diameter. Housed in bore extension 62 is a lower spring 64 for engaging the lower extremity of lower detached stem 60. Cap 58 also includes tapped bore 63 for connection of a fluid pressure line.

Stem bore 52 and bore extension 62 have a coaxial length sufficient to receive both lower attached stem 42 when gate 40 is in its lowermost position in gate chamber 24, lower detached stem 60, and lower spring 64. When lower detached stem 60 is in its nonengaged position and gate 40 is in its uppermost position as shown in FIG. 2, a fluid cavity 70 is formed in stem bore 52 between lower attached stem 42 and lower detached stem 60.

A vent bore or port 72 extends from flow port 18 through housing 16 and into cavity 70 of stem bore 52. When lower detached stem 60 engages lower attached stem 42, fluid is released from cavity 70 through port 72.

The upper portion of valve housing 16 is adapted to matingly receive a bonnet 80 having a closure flange 82 with means such as stud bolts for securing the flange to valve housing 16. Bonnet 80 has a bore 84 coaxial with gate chamber 24 for slidingly receiving upper stem 41. Packing seals 81 surround and seal off fluid flow around upper stem 41.

Now referring to FIG. 2A, mounted on top of bonnet 80 is a cylinder 86 having an inner diameter substantially larger than that of bore 84 and being coaxial therewith. A connecting ring 88 has an exteriorly extending protuberance engageable with an interiorly extending flange on the lower end of cylinder 86 as ring 88 threadingly engages threads on the upper exterior portion of bonnet 80 to attach cylinder 86 to bonnet 80. A closure cap 92 threadingly engages the upper end of cylinder 86 to close piston chamber 90 described below.

Upper stem 41 extends from the upper end of gate 40 in gate chamber 24 into and through axial bore 84 in bonnet 80 and into piston chamber 90 in cylinder cap 86. Piston 100 is secured to the upper end of upper stem 41 by inserting the upper reduced portion of upper stem 41 into a coaxial bore in piston 100. The lower edge of piston 100 rests on the annular shoulder created by the reduced portion of upper stem 41 and is held in position by a snap ring engaging the upper end of upper stem 41 and the upper surface of piston 100.

A bias means such as upper springs 94, 96 are received in piston chamber 90 circumscribing upper stem 41 and compressed between piston 100 and the upper surface of bonnet 80 as gate 40 moves downwardly.

Referring now to FIG. 5 showing a schematic of the hydraulic controls, a submerged hydraulic fluid reservoir 110 is provided with a floating piston 112 and compensated by ambient sea pressure. A diaphragm may be used instead of piston 112. A conduit or line 114 supplies a pump 116 at the surface with hydraulic control power fluid from a reservoir 111 also at the surface. An accumulator 118 located at the surface is connected to pump 116 and to the power stroke end of piston chamber 90 by means of a conduit 120, control valve 124, and a conduit 121. The purpose of the accumulator 118 is to provide a supply of power fluid available for immediate delivery to chamber 90. Conduits or lines 122 and 125 connect the exhaust stroke end of actuator chamber 90 to a reservoir 110 located at the ocean floor. Control valve 124 is arranged on lines 120 and 123 to control the flow of fluids through those lines.

Figure 3:
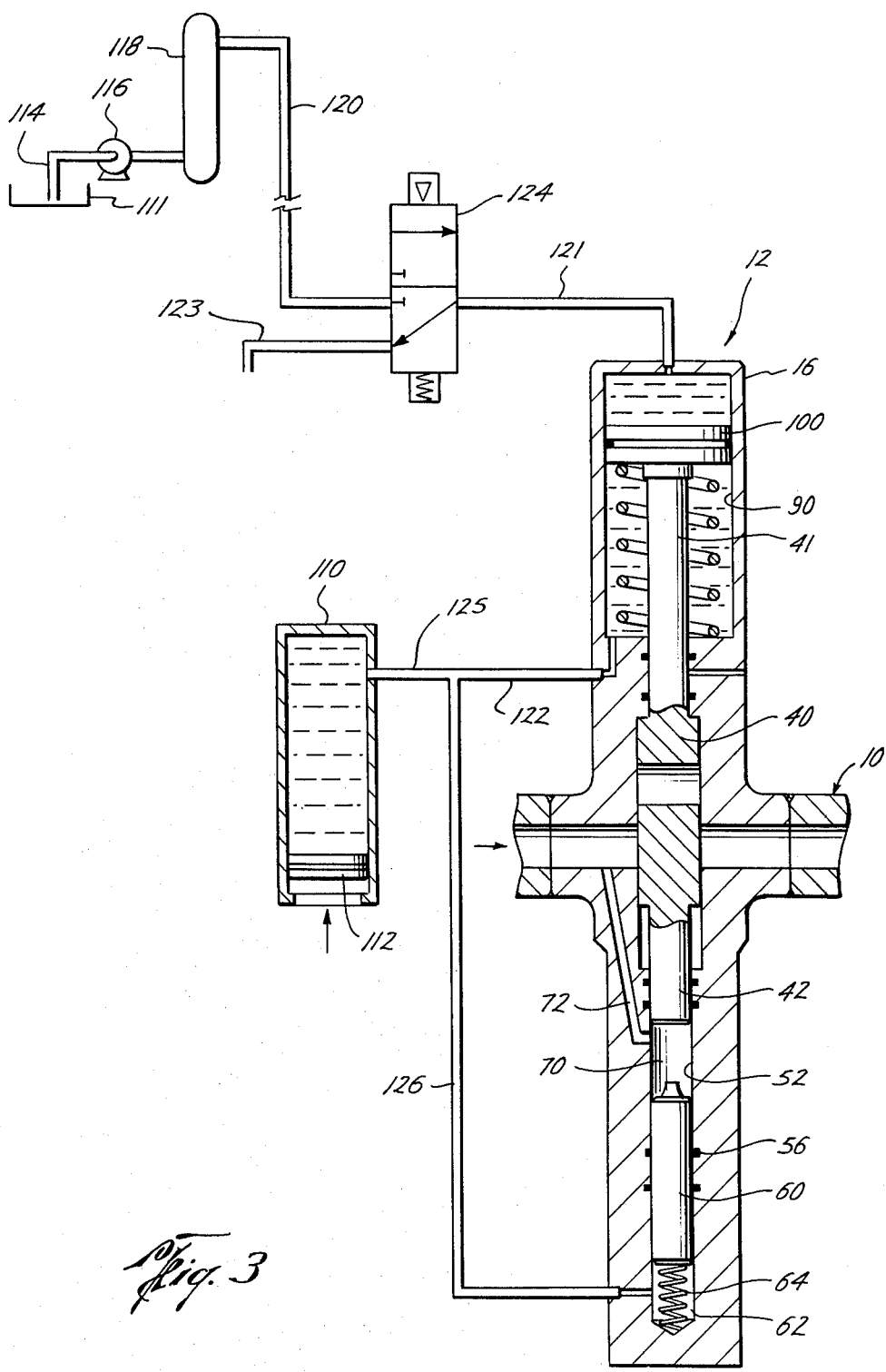
FIG. 3 is a schematic view of the valve and hydraulic actuator controls.

In the fail-safe position of control valve 124 shown in FIG. 3 flow from accumulator 118 through line 120 is blocked. Instead flow from chamber 90 is vented to ambient sea pressure through line 121, control valve 124, and line 123. In the operating position of control valve 124, both lines 120, 121 are open to accumulator 118. Power fluid is applied from accumulator 118 to piston 100 to intitiate the power stroke. Another conduit or line 126 connects bore 62, below lower detached stem 60, and line 125. Lines 122, 125, as described previously, connect the exhaust stroke end of chamber 90 to reservoir 110.

Referring again to FIG. 1 illustrating one environment of the invention, a pressure lock condition can occur during the testing of the blow out preventor. In testing the rams of the blow out preventer, a test plug is run into the well through the riser 16. The rams are closed and pressure is applied through the kill line 19 with the inboard and outboard valves 12, 13 on the choke line 17 closed. Pressure is then applied through the kill line 19 to test the pipe rams.

If the inboard valve 12 leaks or is closed during pressurization of kill line 19, pressure is trapped in section 150 between valves 12, 13 causing gate 40, as shown in FIG. 4, to sealingly engage valve housing 16 around flow port 18 and for gate 40' to sealingly engage valve housing 16' around flow port 20' on valve 13 as illustrated in FIG. 4. Even where the line fluids are incompressible and completely fill short section 150 of flowline 10 between inboard and outboard valves 12, 13 preventing the displacement of the internal valve fluids into section 150, vent port 72 permits such displacement into the flow port 18 thereby avoiding a pressure lock condition of valve 12. It is only necessary to move the gate 40 a sufficient distance to permit fluid flow through flow ways 18, 20 and the transverse opening in the gate 40 thereby releasing the fluid pressure in section 150.

Referring now to FIGS. 1 and 4, in operation pilot control power is applied to control valve 23 and control power fluid is pumped through control valve 23 to the power stroke end of chamber 90. This fluid pressure is then applied to piston 100 moving upper stem 41, gate 40, and lower attached stem 42 downwardly against the bias of spring 96. As lower attached stem 42 moves downwardly into cavity 70 of bore 52 internal valve fluid flows through port 72 and into flow way 18. Thus the internal valve pressure in cavity 70 is released upstream through port 72 where the flowline volume is much greater than in short section 150 thereby avoiding pressure lock and permitting the gate 40 to open valve 12. Lower detached stem 60 remains ineffective.

Referring again to FIG. 2, if pressure becomes trapped between gate segments 36, 38 causing them to seal with gate seats 30, 32 which in turn seal with valve housing 16, a pressure lock condition will occur unless the fluids in cavity 70 are released through a port such as 72. Where the port is inappropriately located so as to attempt to vent the fluids into short section 150 such as in the testing situation previously described, the valve will again pressure lock if the internal valve fluids cannot be displaced in the short section 150. Therefore, it is essential that port 72 permit the fluids in cavity 70 to be displaced into the choke or kill line or into the production line at 130 as shown in FIG. 4 to permit the split gate valve to open.

Referring now to FIG. 5 illustrating the valve position just prior to a fail-safe condition, upon removal of power fluid to valve 12, as for example by failure of control valve 23, control valve 23 automatically shifts under the bias of a spring to its fail-safe position blocking the flow of control fluid and venting fluid from the power stroke end of chamber 90 to ambient sea pressure. Where the upstream pressure is greater than the ambient sea pressure, the upstream pressure and internal valve pressure are transferred through port 72 to place an additional closing force on attached stem 42.

Where the line fluid is a gas which will have a density less than water, the ambient sea pressure could be greater than the upsteam pressure due to the increased hydrostatic head from a location below the water surface. Thus even though hydraulic control pressure is zero, there still remains an ambient sea pressure on lines 121, 122 and 126. If spring 96 is not large enough to overcome the ambient sea pressure on the area of upper stem 41, the valve will not close. However, in the present design, the ambient sea pressure urges lower detached stem 60 into engagement with lower attached stem 42. Lower spring 64 overcomes the seal friction at 56 to assist lower detached stem 60 in engaging lower attached stem 42. Thus lower detached stem 60 balances any unwanted force on upper stem 41 due to the ambient sea pressure and spring 96 is permitted to move gate 40 upwardly closing valve 12.

The description above concerning pressure lock and fail-safe can also occur to the outboard valve where the downstream pressure is concerned and not the upstream pressure. The outboard valve 13 will vent internal valve pressure downstream through port 152 and not into the short section 150.

Changes and modifications may be made in the specific illustrated embodiments of the invention shown and/or described herein without departing from the scope of the invention as defined in the appended claims.

I claim:

1. A gate valve for operation on a submerged flowline comprising:
   a valve housing having a valve chamber, a flow way intersecting said valve chamber, and a stem bore extending from said valve chamber;
   a bonnet disposed on said valve housing having an actuator chamber and a bore extending from said actuator chamber into said valve chamber;
   a closure member disposed on said valve housing having a bore extension coaxial with said stem bore;
   a gate disposed in said valve chamber movable between an open position and a closed position, said gate having gate segments connected to first and second attached stems, said first stem extending through said bonnet bore and into said actuator chamber and said second attached stem extending into said stem bore;
   a piston connected to said first attached stem and disposed in said actuator chamber for urging said gate between said open and closed positions;
   biasing means disposed in said actuator chamber engaging said piston for urging said gate from said open position to said closed position;
   a detached stem disposed in said stem bore and extending into said bore extension and movable into engagement with said second attached stem;
   seals around said first attached stem, around said second attached stem, and around said detached stem;
   spring means disposed in said bore extension and engaging said detached stem;
   port means extending from said flow way to said stem bore between said second attached stem and one end of said detached stem;
   first means for supplying hydraulic fluid pressure and ambient sea pressure to one side of said piston, said first means applying a force on said piston to move said gate from said closed position to said open position where upon internal valve fluid is displaced from said stem bore through said port means as said second attached stem decreases the fluid volume in said stem bore and said second attached stem engages said detached stem to compress said spring means; and
   second means for supplying ambient sea pressure to the other end of said detached stem in said bore extension and to the other side of said piston for applying an equivalent opposing force to the ambient sea pressure on said piston, said biasing means applying force to said piston to urge said gate from said open position to said closed position where upon the upstream line pressure assists said biasing means when the upstream line pressure is greater than ambient sea pressure and said detached stem engages said second attached stem when ambient sea pressure is greater than the upstream line pressure, said spring means urging said detached stem toward said second attached stem to overcome the frictional forces of said seals around said detached stem.

2. A gate valve connected to a second valve and operating in series therewith on a submerged flowline, comprising:
   a valve housing having a valve chamber, a flow way intersecting said valve chamber, and a stem bore extending from said valve chamber, said flow way being connected to the flowline at one end and to the second valve at the other end;
   a gate disposed in said valve chamber movable between an open position and a closed position, said gate being connected to first and second attached stems, said second attached stem extending into said stem bore;
   a piston connected to said first attached stem for urging said gate between said open and closed positions;
   biasing means engaging said piston for urging said gate from said open position to said closed position;
   a detached stem disposed in said stem bore and movable into engagement with said second attached stem;
   seals around said detached stem;
   spring means disposed in said stem bore and engaging said detached stem;
   port means extending from said flow way adjacent said flowline one end to said stem bore between said second attached stem and one end of said detached stem;
   first means for applying hydraulic fluid pressure and ambient sea pressure to one side of said piston to move said gate from said closed position to said open position where upon internal valve fluid is displaced from said stem bore to said flow way through said port means as said second attached stem decreases the fluid volume in said stem bore and said second attached stem engages said detached stem to compress said spring means; and
   second means for communicating ambient sea pressure to the other end of said detached stem in the stem bore and to said other side of said piston for applying an equivalent opposing force to the ambient sea pressure on said one side of said piston, said biasing means applying force to said piston to urge said gate from said open position to said closed position where upon the upstream line pressure assists said biasing means when the upstream line pressure is greater than ambient sea pressure and said detached stem engages said second attached stem when ambient sea pressure is greater than the upstream line pressure, said spring means urging said detached stem toward said second attached stem.

* * * * *

UNITED STATES PATENT AND TRADEMARK OFFICE
CERTIFICATE OF CORRECTION

PATENT NO. : 4,294,284
DATED : October 13, 1981
INVENTOR(S) : David P. Herd

It is certified that error appears in the above—identified patent and that said Letters Patent is hereby corrected as shown below:

Column 5, line 23: delete "in"
Column 5, line 46: change "chambers" to --chamber--.
Column 7, line 15: change "FIG. 5" to --FIG. 3--.
Column 10, line 43: change "in the" to --in said--.
Column 10, line 44: change "to said" to --to the--.

Signed and Sealed this

Ninth Day of February 1982

[SEAL]

Attest:

GERALD J. MOSSINGHOFF

*Attesting Officer*   *Commissioner of Patents and Trademarks*